United States Patent
Naineni et al.

(10) Patent No.: US 8,041,676 B2
(45) Date of Patent: Oct. 18, 2011

(54) BACKUP AND RESTORE OF FILE SYSTEM OBJECTS OF UNKNOWN TYPE

(75) Inventors: Malahal R. Naineni, Tigard, OR (US); Ninad S. Palsule, Beaverton, OR (US); Alexei Kojenov, San Jose, CA (US); Venkateswararao Jujjuri, Beaverton, OR (US); James J. Seeger, Jr., Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 11/293,650

(22) Filed: Dec. 2, 2005

(65) Prior Publication Data

US 2007/0130230 A1 Jun. 7, 2007

(51) Int. Cl.
 G06F 7/00 (2006.01)
 G06F 17/00 (2006.01)
 G06F 12/00 (2006.01)
 G06F 13/00 (2006.01)
 G06F 13/28 (2006.01)

(52) U.S. Cl. .................. 707/640; 711/161; 711/162

(58) Field of Classification Search .................. 707/640
See application file for complete search history.

(56) References Cited

U.S. PATENT DOCUMENTS

| | | | |
|---|---|---|---|
| 5,649,196 A | 7/1997 | Woodhill et al. | |
| 6,003,042 A | 12/1999 | Melahn | |
| 6,038,379 A * | 3/2000 | Fletcher et al. | 709/230 |
| 6,088,694 A * | 7/2000 | Burns et al. | 707/8 |
| 6,442,548 B1 | 8/2002 | Balabine et al. | |
| 6,490,598 B1 | 12/2002 | Taylor | |
| 6,665,689 B2 * | 12/2003 | Muhlestein | 707/204 |
| 6,714,980 B1 | 3/2004 | Markson et al. | |
| 7,454,406 B2 * | 11/2008 | Kaplan et al. | 1/1 |
| 2002/0166026 A1 | 11/2002 | Ulrich et al. | |
| 2003/0058277 A1 | 3/2003 | Bowman-Amuah | |
| 2003/0126247 A1 | 7/2003 | Strasser et al. | |
| 2003/0182301 A1 | 9/2003 | Patterson et al. | |
| 2003/0200256 A1 | 10/2003 | Hu et al. | |

(Continued)

FOREIGN PATENT DOCUMENTS

WO 95/13580 A 9/2004

OTHER PUBLICATIONS

International search report in corresponding PCT patent application No. PCT/EP2006/069141.

Primary Examiner — Charles Rones
Assistant Examiner — Harold Hotelling
(74) Attorney, Agent, or Firm — Steven Bennett

(57) ABSTRACT

File system objects of unknown type are backed up and restored. A list of file system objects is received from a file system. The file system objects are to be backed up. For each file system object that has a file type that is unknown, the following is performed. First, the file system is queried to obtain information regarding the file system object that is sufficient for the file system to later recreate the file system object if necessary. Second, the file system object and the information regarding the file system object are stored. Examples of file system object types of the file system that may be unknown to an application running on a Microsoft Windows® operating system include symbolic links, named pipes, and special device files.

25 Claims, 5 Drawing Sheets

U.S. PATENT DOCUMENTS

| | | |
|---|---|---|
| 2003/0225800 A1* | 12/2003 | Kavuri .......................... 707/204 |
| 2004/0148308 A1 | 7/2004 | Rajan et al. |
| 2004/0186844 A1 | 9/2004 | Muhlestein |
| 2005/0028025 A1 | 2/2005 | Zalewski et al. |
| 2005/0086445 A1 | 4/2005 | Mizuno et al. |
| 2005/0160243 A1 | 7/2005 | Lubbers et al. |
| 2006/0077945 A1* | 4/2006 | KethiReddy et al. ......... 370/346 |

* cited by examiner

BACKUP AND RESTORE OF FILE SYSTEM OBJECTS OF UNKNOWN TYPE

FIELD OF THE INVENTION

The present invention relates generally to the backing up and the restoring of file system objects, and more particularly to such backing up and restoring of file system objects that are of unknown type.

BACKGROUND OF THE INVENTION

Computerized systems commonly store data that is critical in nature, or that if lost could only be recreated with great difficulty, if at all. Therefore, it is common to back up files so that they can be restored if needed. For example, a storage device storing the files may fail, such that the backup copy of the data files stored on a different storage device can instead be used. As another example, a user may accidentally delete a needed data file, such that the backup copy of the data file allows the user to restore the data file. As a final example, a needed file may become corrupted by incorrect system operation, such that the backup copy of the file can be used.

Data is commonly stored within a file system, which specifies the approach for storing and retrieving files on a hard disk drive or other storage device. For instance, a file system defines the directory structure for keeping track of the files and the path syntax required to access them. The file system may also define the way files are named as well as the maximum size of a file or volume. A file system particularly stores file system objects, where each file system object can refer to a data file, a directory structure, or another type of data that is stored on the hard disk drive or other storage device in question.

Backing up a file system thus can involve backing up all the file system objects stored on a given hard disk drive or other storage device. By backing up all the file system objects of a file system, even if the hard disk drive or other storage device fails in an unrecoverable manner, the data stored thereon is not lost. Rather, the file system objects of the file system can be recreated based on the backup copy of the file system objects.

A file system may be backed up to a tape backup device. For example, some versions of the Microsoft Windows® operating system employ the NT file system (NTFS). Backing up a hard disk drive that stores file system objects in accordance with the NTFS thus typically involves using a backup application running on the Microsoft Windows® operating system, and therefore in relation to the NTFS. The backup application typically retrieves all the file system objects stored on the hard disk drive, and stores them on a tape inserted into the tape backup device. Because the hard disk drive stores file system objects in accordance with the NTFS that is used by the Microsoft Windows® operating system itself, backup is easily accomplished, because the operating system has knowledge of all the different types of file system objects that may be stored on the hard disk drive.

More recently, heterogeneous file systems have become more common, in which file system objects are stored for and by a variety of different operating systems. For example, storage-area network (SAN) file systems may be employed to store file system objects from computing devices running in relation to the Microsoft Windows® operating system, the LINUX® operating system, the UNIX® operating system, as well as other types of operating system. That is, computing devices running the Microsoft Windows®, the LINUX®, and the UNIX® operating systems, for instance, may all store file system objects on the same hard disk drives of the same SAN file system.

A SAN file system may run one type of file system, such as the SANFS available from International Business Machines, Inc., of Armonk N.Y., but the SANFS is able to store file system objects consistent with the file systems that individual computing devices typically use. For instance, a computing device running the Microsoft Windows® operating system may store file system objects to the SAN file system as if the SAN file system were the NTFS. Similarly, computing devices running the LINUX® and the UNIX® operating systems may store file system objects to the SAN file system as if the SAN file system were the LINUX® and the UNIX® file systems, respectively. That is, a computing device running the UNIX® operating system, for example, is able to store file system objects to the SAN file system no different than if the computing device were storing file system objects to the UNIX® file system.

Therefore, a backup application running on a computing device in relation to one type of operating system, and that is to back up all file system objects stored on the SAN file system, may encounter file system objects of which its operating system and typical file system do not have knowledge. For example, there may be types of file system objects that are present on the SAN file system that have been stored by computing devices running the UNIX® or the LINUX® operating system, as if the SAN file system were the UNIX® or the LINUX® file system. These file system objects are not known to the NTFS that is used with the Microsoft Windows® operating system. That is, computing devices running the UNIX® and the LINUX® operating systems may store file system objects on the SAN file system that are not known to the backup application, because the backup application may be running on the Microsoft Windows® operating system, and thus is only knowledgeable of file system objects that are particularly known to the NTFS. Because the backup application running on the Microsoft Windows® operating systems accesses the SAN file system no different than if it were the NTFS, it is knowledgeable only of file system objects that are particularly known to the NTFS.

As a result, some types of file system objects may not be able to be backed up properly by a backup application running on the Microsoft Windows® operating system and that expects all file system objects to be known to the NTFS, since it accesses the SAN file system no different than if it were the NTFS. For instance, within the UNIX® and the LINUX® file systems, there are types of file system objects that have no direct counterparts within the NTFS. For example, such file system object types include symbolic links, named pipes (also known as first-in-first-out pipes), and special device files. A symbolic link is a type of file system object that allows nearly transparent reference to a target directory entry, such as a target file or a target directory. Thus, referencing the symbolic link in actuality references another file system object, such as a target file or a target directory.

A named pipe is a type of file system object that is used to transfer data between two unrelated processes. One or more processes write data to the pipe, where the pipe is referenced as a file system object, even though the data is usually stored in volatile memory apart from the file system in question. One or more other processes thus read the data from the pipe. The data is processed in a first-in, first-out (FIFO) manner, and the data is consumed, or erased, as it is read. Finally, a special device file is a file that references a device, such as a printing device, for example, so that input/output (I/O) to the device is accomplished in the same way that I/O is normally accomplished in relation to a file. A special device file is a special file in that it does not contain data, like a regular file does, or information about other files, like a directory does.

Backup applications running on operating systems that access a SAN file system as if it were the NTFS, or another file system that itself does not employ symbolic links, named pipes, and special device files, thus cannot inherently back up these types of file system objects. A backup application running on the Microsoft Windows® operating system and thus in relation to a SAN file system as if it were the NTFS, and that is attempting to back up these types of file system objects from a SAN file system, will read the data of the file system objects, but will not be able to instruct the SAN file system to recreate the file system objects properly if or when later such restoration is required. For example, the backup application is able to retrieve a file system object from a SAN system corresponding to a special device file, and is able to store the file system object, such as on a tape inserted into a tape drive. However, if or when the backup application needs to restore the file system object back to the SAN file system, it is not able to instruct the SAN file system that the file system object is a special device file, and thus should be recreated as such. Therefore, the special device file is not likely to be recreated correctly.

There is thus a need that overcomes these deficiencies within the prior art. That is, there is a need within the prior art for file system backup, in which all the file system objects that may be stored on a file system are able to be backed up, and subsequently restored, even when the backup application is running on an operating system that is typically used with a type of file system that does not have knowledge of the types of some of the file system objects. For this and other reasons, therefore, there is a need for the present invention.

SUMMARY OF THE INVENTION

The present invention relates to the backing up and the restoring of file system objects of unknown type. A method of an embodiment of the invention receives a list of file system objects from a file system. The file system objects are to be backed up. For each file system object that has a file type that is unknown, the following is performed. First, the file system is queried to obtain information regarding the file system object that is sufficient for the file system to later recreate the file system object if necessary. Second, the file system object and the information regarding the file system object are stored. The method may be performed by an application program, such as a backup application.

The file system may be queried for the list of file system objects to be backed up prior to the list of file system objects being received from the file system. Whether the file type of each file system object is known or unknown may further be determined. For instance, a component of the file system may be called to determine whether the file type is known or unknown.

The information regarding a file system object that is sufficient for the file system to later recreate the file system object may be received in response to querying the file system for this information. Furthermore, each file system object that has a file type known to the backup application may be stored.

In one embodiment, the file system is queried to obtain the information regarding a file system object of unknown type and that is sufficient for the file system to later recreate the file system object by calling an interface, such as a preinstalled interface. A library may be initially installed that is specific to the file system and that exposes the interface that is to be called.

In one embodiment, querying the file system to obtain the information regarding a file system object of unknown type and that is sufficient for the file system to later recreate the file system object is accomplished by querying the file system for a binary large object (BLOB) attribute of the file system object that is sufficient for the file system to later recreate the file system object. The file system object and the BLOB attribute of the file system object are thus then stored. Furthermore, the file system objects that are of unknown type may be symbolic links, named pipes, and/or device special files in one embodiment of the invention.

A method of another embodiment of the invention includes retrieving a file system object to be restored to a file system. The file system object has a file type that is unknown. Information regarding the file system object, as previously provided by the file system and as previously stored, is also retrieved. The information regarding the file system object is sufficient for the file system to recreate the file system object. The file system object and the information regarding the file system object are sent to the file system for the file system to recreate the file system object thereat, using the information.

A computerized system of an embodiment of the invention includes a file system, and an application, such as a backup application. The file system is for storing a number of file system objects. At least one of the file system objects of the file system has a file type unknown to the application. The application is to backup the file system objects from the file system. For each file system object having a file type unknown to the application, the application stores information regarding the file system object, as provided by the file system, along with the file system object itself. This information is sufficient for the file system to later recreate the file system object if necessary.

A computerized system of another embodiment of the invention includes a file system component for a remote file system. The computerized system further includes means for backing up the file system objects from the remote file system. For each file system object having an unknown file type, the means stores information regarding the file system object, as provided by the remote file system, along with the file system object itself. This information is sufficient for the remote file system to later recreate the file system object if necessary.

An article of manufacture of an embodiment of the invention includes a tangible computer-readable medium, and means in the medium. The computer-readable medium may be a recordable data storage medium, or another type of tangible computer-readable medium. The means is for backing up a number of file system objects from a file system. At least one of the file system objects of the file system has an unknown file type. For each file system object that has an unknown file type, the means stores information regarding the file system object, as provided by the file system, along with the file system object itself. The information is sufficient for the file system to later recreate the file system object.

Embodiments of the invention provide for advantages over the prior art. Embodiments of the invention allow for a file system to be backed up, even if the file system has file system object types that are unknown to a backup application performing the backup process. For example, the file system being backed up may be a storage-area network (SAN) file system, such as the SANFS. The SAN file system may store file system objects from computing devices running the UNIX® operating system, where such file system objects may include file system object types that are known to the UNIX® file system but not to the NT file system (NTFS) typically employed by the Microsoft Windows® operating system. File system objects of the UNIX® file system may include symbolic links, named pipes, and special device files, as well as other types of file system objects that are not known to the NTFS. The backup application may be running on a computing device using the Microsoft Windows® operating system, and may be running in relation to a component of the SAN file system such that the backup application accesses the SAN file system as if it were the NTFS. Embodiments of the invention still allow the backup application to properly backup file system objects that are not known to it. For instance, the backup application is still able to back up types of files objects that are known to the UNIX® file system, but not to the NTFS, in a way that allows for later recreation of the file system objects.

This is because when a file system object having an unknown file type is encountered, the backup application queries the SAN file system on which the file system object is stored, for example, to obtain information therefrom that is sufficient for the SAN file system to later recreate the file system object if necessary. The information is stored along with the file system object itself, such as on a tape inserted into a tape backup device, for example. When or if recreation of the file system object is to be accomplished at the SAN file system, the backup application provides the SAN file system with the file system object as well as the information that was previously provided by the SAN file system. Using this information, the SAN file system is able to recreate the file system object thereat, even though the file system object has a type that is unknown to it. For instance, the file system object may have a type that is typically known to the UNIX® file system, but that is not known to the NTFS. The backup application still allows this file system object to be recreated at the SAN file system, because it has stored information regarding the file system object that allows the SAN file system to properly recreate the file system object.

Still other advantages, embodiments, and aspects of the inventions will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
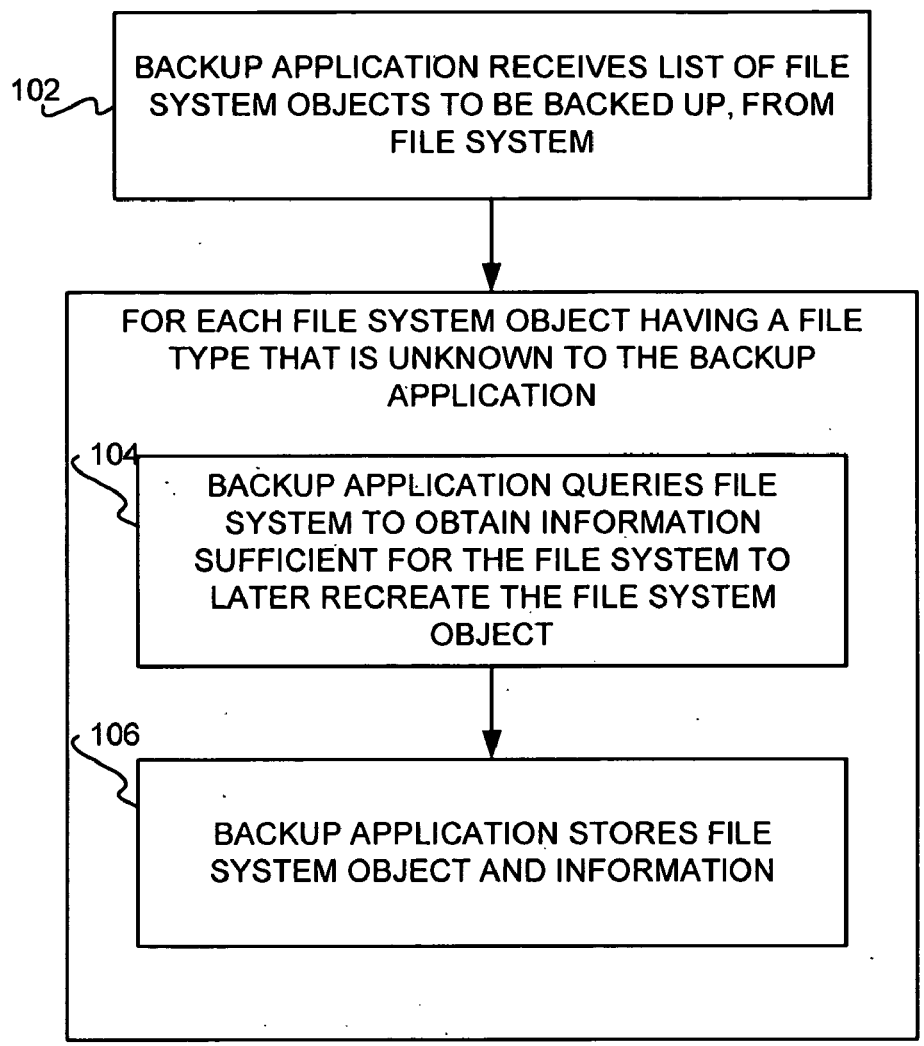
FIG. 1 is a flowchart of a method, according to an embodiment of the invention, and is suggested for printing on the first page of the patent.

FIG. 1 shows a method 100, according to an embodiment of the invention. The method 100 is for backing up file system objects currently stored on a file system. The file system may be considered a heterogeneous file system, in that it stores file system objects that are typically stored on a variety of different file systems. As has been described, a file system specifies the approach for storing and retrieving files on a hard disk drive or other storage device. For example, the file system may be a storage-area network (SAN) file system, such as the above-mentioned SANFS. The file system may store file system objects from computing devices running different operating systems, such as versions of the UNIX®, the LINUX®, and the Microsoft Windows® operating systems. These computing devices typically store file system objects on the UNIX®, the LINUX®, and the NT file system (NTFS) file systems, respectively. Therefore, the SAN file system is heterogeneous, in that it is able to store file system objects that are typically stored on the UNIX®, the LINUX®, and the NTFS file systems.

A backup application performs the method 100. The backup application is an application computer program, or part of another computer program, such as an operating system of a computing device, that is to backup the file system. The backup application runs in relation to an operating system that may have a native file system. For example, the backup application may run in relation to the NTFS, in that it runs on the Microsoft Windows® operating system that typically employs the NTFS. The backup application runs in relation to the file system that is being backed up in that it accesses the file system that is being backed up no different than if this file system were the native file system of the operating system in question. For example, the backup application may be running on the Microsoft Windows® operating system, and thus may access a SAN file system to be backed up as if it were the native NTFS of the Microsoft Windows® operating system.

The backup application receives from the file system a list of file system objects stored at the file system (102). A file system object is the entity or unit of storage for data stored by a file system on a hard disk drive or other storage device. A file system object, as has been described, may refer to a data file, a directory structure, or another type of data that is stored on the hard disk drive or other storage device in question.

One or more of the file system objects of the file system have file system object types that are unknown to the backup application. For example, as has been described above, symbolic links, named pipes, and special device files are types of file system objects that are known to the UNIX® and LINUX® file systems, but that are not known to the NTFS. Thus, if the backup application is running on the Microsoft Windows® operating system, it accesses a SAN file system being backed up as if the SAN file system were the NTFS. Therefore, file system objects that are stored by other computing devices running operating systems that do not access the SAN file system as if it were the NTFS may have file system object types that are not known to the backup application.

Therefore, backing up such file system objects is not a simple matter of retrieving them from the file system on which they have been created and thus known, and storing them on another storage device, such as a tape inserted into a tape backup device. This is because the file system objects themselves contain insufficient information to allow for their later recreation at the file system when restoring the file system objects as have been backed up. Because the backup application does not know the types of the file system objects, the backup application is normally unable to instruct the file system how to properly recreate these file system objects when restoration is needed.

Therefore, for each file system object that has a file type that is unknown to the backup application, the backup application performs the following. First, the backup application queries the file system to obtain information regarding the file system object that is sufficient for the file system to later recreate the file system object (104). For example, the file system may provide the backup application with information in the form of a binary large object (BLOB). This information may indicate that the file system object in question is a symbolic link, a named pipe, or a special device file, as well as whatever other information the file system would need to recreate the file system object if requested to do so by the backup application.

Second, the backup application then stores the file system object, along with the information regarding the file system object that has been received from the file system (106). The backup application may store the file system object, along with this information, on a tape inserted into a tape backup device, or may store the file system object and this information another type of storage device, such as a hard disk drive. Thus, besides just the file system object being backed up, the information sufficient for the file system to recreate the file system object thereat is also backed up. It is noted that the backup application does not act upon the information regarding the file system object that the file system provides. That is, the backup application does not need to analyze the information, or use the information in any way. Rather, the backup application simply stores the information along with the file system object itself. If restoration of the file system object is later required, then this information, along with the file system object itself, is provided to the file system, and it is the file system that uses the information in order to properly recreate the file system object thereat.

Computerized Systems

Figure 2:
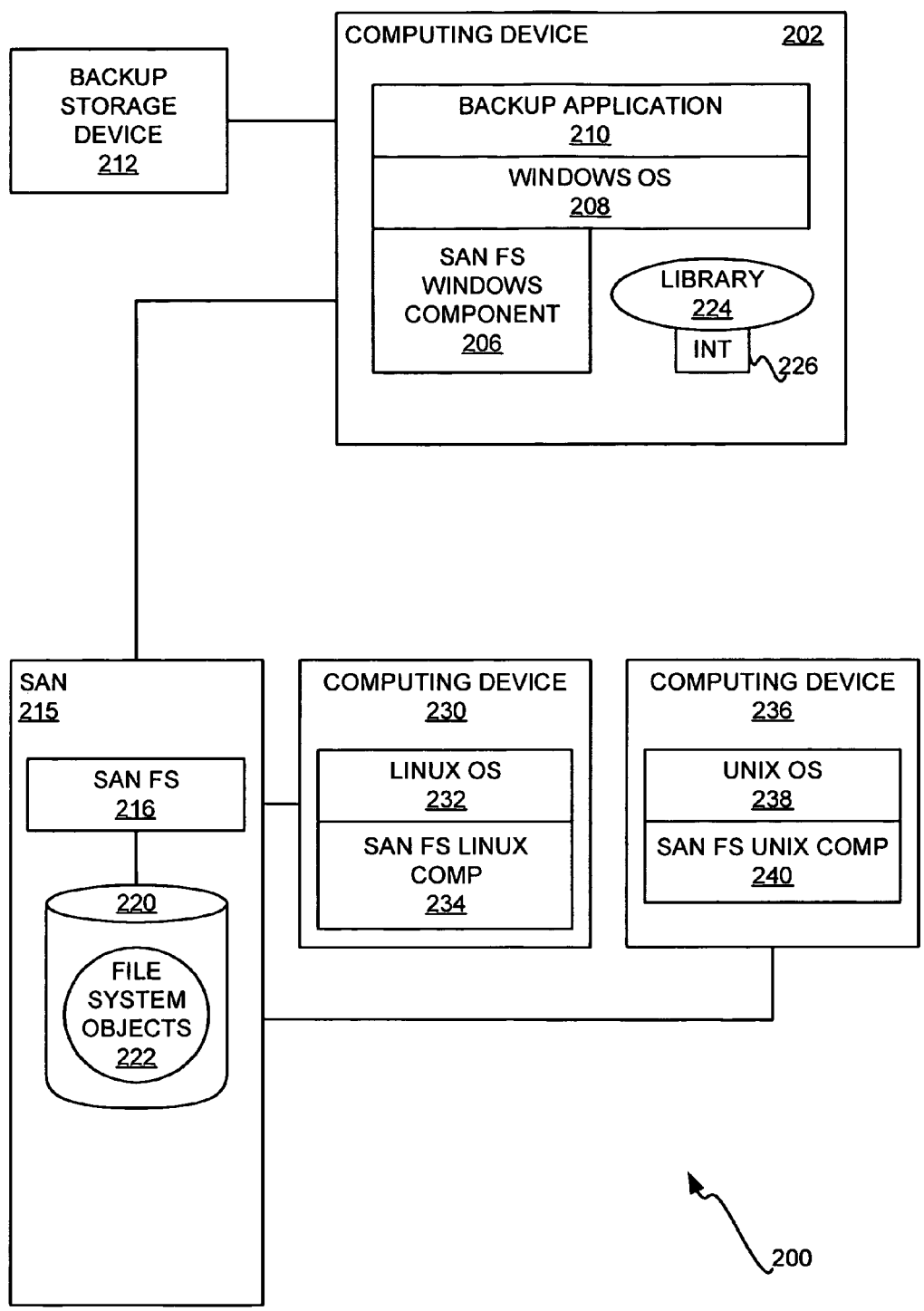
FIG. 2 is a diagram of a computerized system for heterogeneous file system backup and restore, according to an embodiment of the invention.

FIG. 2 shows a computerized system 200 for heterogeneous backup and restore of file system objects, according to an embodiment of the invention. The system 200 includes computing devices 202, 230, and 236, communicatively interconnected to one another via a storage-area network (SAN) 215. The computing devices 202, 230, and 236 can, and typically do, include components in addition to those depicted in FIG. 2. As can be appreciated by those of ordinary skill within the art, there may be additional computing devices, in addition to the computing devices 202, 230, and 236 depicted in FIG. 2.

The computing device 202 has the following "stack" of software run thereon: a file system component 206, an operating system 208 that employs the file system component 206, and a backup application 210 that runs on the operating system 208. There also is a library 224 running on the computing device 202, which is for the file system component 206 and is specific to the SAN file system 216. As can be appreciated by those of ordinary skill within the art, the computing device 202 may have other software run thereon, in addition to and/or in lieu of the file system component 206, the operating system 208, and the backup application 210.

As depicted in FIG. 2, the operating system 208 is the Microsoft Windows® operating system, and the file system component 206 is a SAN file system Windows® component. The file system component 206 is for storing data and other information on an associated storage device in the form of file system objects, on the SAN 215. When it is said that the file system component 206 stores a file system object, this phraseology is shorthand for the storage of the file system object on a storage device associated with the file system component 206, on the SAN 215, in accordance with the approach specified by the file system component 206.

The file system component 206 allows the operating system 208, and thus the backup application 210 running on the operating system 208, to store file system objects on the SAN 215, and thus on the SAN file system 216, as if the SAN file system 216 were the native file system of the Microsoft Windows® operating system, the NT file system (NTFS). That is, the file system component 206 is a SAN file system Windows® component in that it allows the Microsoft Windows® operating system, and application programs running on the Microsoft Windows® operating system, to store file system objects on the SAN 215, and thus on the SAN file system 216, as if the SAN file system 216 were the NTFS. In this way, the operating system 208 and the backup application 210 store file system objects on the SAN file system 216 as if the SAN file system 216 were the native file system of the Microsoft Windows® operating system.

The library 224 is preinstalled desirably by the backup application 210. The library 224 is specific to the SAN file system 216. The library 224 exposes an interface 226, which serves at least two purposes. First, during backup of the file system objects 222 from the SAN file system 216, the backup application 210 is able to call the interface 226 to obtain the aforementioned information regarding any of the file system objects 222 that has a type unknown to the backup application 210. The library 224 in this respect communicates, via the file system component 206, with the SAN file system 216 to obtain this information. Second, during restoration of the file system objects 222 back to the file system 216, the backup application 210 is able to call the interface 226 to provide the aforementioned information regarding any of the file system objects 222, so that the interface 226 is able to properly recreate the file system object in question. The library 224 in this respect, via the file system component 206, communicates with the SAN file system 216 to provide this information. Both of these aspects of the present invention are described in more detail later in the detailed description. It is noted that the information retrieved by the library 224 is stored in the SAN file system 216. The terminology library as used herein encompasses a library of computer code, which is executed by calling an interface thereof.

The interface 226 of the library 224 may also be called by the backup application 210 to determine whether a given file system object has a file system object type that is known or unknown to the file system component 206, and thus to the computing device 202 itself and to the backup application 210. That is, the backup application 210, when encountering a file system object, is able to call the interface 226 to determine whether the file system object type of the file system object is known or unknown to the file system component 206. Whether the file system object type of the file system object is known or unknown is inherent to the file system component 206. That is, the file system component 206 only knows of file system object types for the native file system that it is effectively mimicking, since the file system component 206 is specific to the operating system 208.

Therefore, insofar as the operating system 208 is the Microsoft Windows® operating system, the file system component 206 only knows of file system object types that are normally known to the native file system for this operating system, specifically the NTFS. The interface 226 is thus able to determine whether the file system object type of the file system object is known or unknown to the file system component 206 by directly querying the file system component 206. The file system component 206 necessarily either knows or does not know the file system object type in question, and returns this information back through the interface 226.

It is noted that the file system component 206 is knowledgeable only of file system object types that are typically known to the native file system of the operating system 208. For instance, where the operating system 208 is the Microsoft Windows® operating system, the file system component 206 is knowledgeable only of file system object types that are known to the NTFS. Other file types, which may be particular to the UNIX® file system or the LINUX® file system, for instance, are not known to the NTFS, and thus are not known to the file system component 206.

The computing device 230 has the following "stack" of software run thereon: a file system component 234 and an operating system 232 that employs the file system component 234. As can be appreciated by those of ordinary skill within the art, the computing device 230 may have other software run thereon, in addition to and/or in lieu of the file system component 234 and the operating system 232. As depicted in FIG. 2, the operating system 232 is the LINUX® operating system, and the file system component 234 is a SAN file system LINUX® component. The file system component 234 is for storing data and other information on an associated storage device in the form of the file system objects, on the SAN 215, in accordance with the approach specified by the file system component 234.

The file system component 234 allows the operating system 232, and application programs (not shown) running on the operating system 232, to store file system objects on the SAN 215, and thus on the SAN file system 216, as if the SAN file system 216 were the native file system of the LINUX® operating system, the LINUX® file system. That is, the file system component 234 is a SAN file system LINUX® component in that it allows the LINUX® operating system, and application programs running on the LINUX® operating system, to store file system objects on the SAN 215, and thus on the SAN file system 216, as if the SAN file system 216 were the LINUX® file system. In this way, the operating system 232 and application programs running on the operating system 232 store file system objects on the SAN file system 216 as if the SAN file system 216 were the native file system of the LINUX® operating system.

The computing device 236 has the following "stack" of software run thereon: a file system component 240 and an operating system 238 that employs the file system component 240. As can be appreciated by those of ordinary skill within the art, the computing device 236 may have other software run thereon, in addition to and/or in lieu of the file system component 240 and the operating system 238. As depicted in FIG. 2, the operating system 238 is the UNIX® operating system, and the file system component 240 is a SAN file system UNIX® component. The file system component 240 is for storing data and other information on an associated storage device in the form of file system objects, on the SAN 215, in accordance with the approach specified by the file system component 240.

The file system component 240 allows the operating system 238, and application programs (not shown) running on the operating system 238, to store file system objects on the SAN 215, and thus on the SAN file system 216, as if the SAN file system 216 were the native file system of the UNIX® operating system, the UNIX® file system. That is, the file system component 240 is a SAN file system UNIX® component in that it allows the UNIX® operating system, and application programs running on the UNIX® operating system, to store file system objects on the SAN 215, and thus on the SAN file system 216, as if the SAN file system 216 were the UNIX® file system. In this way, the operating system 238 and application programs running on the operating system 238 store file system objects on the SAN file system 216 as if the SAN file system 216 were the native file system of the UNIX® operating system.

The SAN 215 has a SAN file system 216 run thereon. A SAN is a network of storage devices, where one such storage device 220 is exemplarily depicted in FIG. 2. As can be appreciated by those of ordinary skill within the art, the SAN 215 may have other software run thereon, in addition to and/or in lieu of the file system 216. The SAN file system 216 may in one embodiment of the invention be the SANFS available from International Business Machines, Inc., of Armonk, N.Y.

The file system 216 is for storing data and other information on an associated storage device 220 in the form of file system objects 222. The storage device 220 may be a hard disk drive, or another type of non-volatile storage. When it is said that the file system 216 stores a file system object, this phraseology is shorthand for the storage of the file system object on the storage device 220 associated with the file system 216, in accordance with the approach specified by the file system 216.

As has been described, the computing devices 202, 230, and 236 are able to store file system objects on the storage device 220 of the SAN 215, as if the SAN file system 216 were the native file systems of the computing devices 202, 230, and 236. For example, the computing device 202 is able to store file system objects of types known to the NTFS on the storage device 220, such that it can be considered that the SAN file system 216 exposes an NTFS-like file system interface to the computing device 202 via the file system component 206. Similarly, the computing device 230 is able to store file system objects of types known to the LINUX® file system on the storage device 220, such that it can be considered that the SAN file system 216 exposes a LINUX® file system-like file system interface to the computing device 230 via the file system component 234. Finally, the computing device 236 is able to store file system objects of types known to the UNIX® file system on the storage device 220, such that it can be considered than the SAN file system 216 exposes a UNIX® file system-like file system interface to the computing device 236 via the file system component 240. Thus, the SAN 215 has a heterogeneous SAN file system 216, because it is able to store file system objects of types that are typically native to and stored on a variety of file systems, such as the NTFS, the UNIX® file system, and the LINUX® file system.

The backup application 210 running on the computing device 202 in relation to the file system component 206 is for backing up the file system objects 222 of the file system 216, such as onto the backup storage device 212. The backup storage device 212 may be a tape backup device in which data is stored on a tape, or another type of backup storage device. There may be file system objects stored on the SAN file system 216 that have types that are unknown to the backup application 210. This is because the computing devices 230 and 236 may store file system objects on the file system 216 that are of types that are particular to their native file systems, and that are unknown to the native file system of the computing device 202. In such instance, the backup application 210 stores information regarding the file system objects along with them when backing up the file system 216, as has been described. That is, such information regarding a given file system object includes the information that is sufficient for the file system 216 to recreate the file system object. This information may be in the form of a binary large object (BLOB).

It is noted that the computerized system 200 is described in conjunction with FIG. 2 in relation to an embodiment of the invention in which the backup application 210 runs on a computing device 202 on which a Microsoft Windows® operating system 208 is also running. Thus, the embodiment of the invention of FIG. 2 pertains to the situation where a backup application 210 is able to backup the file system objects 222 of the SAN 215, even if some of the file system objects 222 have file system object types that are particular to the LINUX® file system and/or the UNIX® file system, for instance, and not known to the native NTFS of the Microsoft Windows® operating system 208. However, in other embodiments of the invention, a backup application may run on a computing device on which a LINUX®, a UNIX®, or another operating system is also running. In such embodiments, the backup application is still able to backup the file system objects 222 of the SAN 215, even if some of the file system objects 222 have file system objects that are particular to the NTFS, for instance, and not known to the LINUX®, the UNIX®, or another file system. Furthermore, embodiments of the invention are not limited to any particular file system, and can be employed in relation to all types of file systems.

As can be appreciated by those of ordinary skill within the art, embodiments of the invention can be implemented in conjunction with computerized systems other than the computerized system 200. For instance, embodiments of the invention may not necessarily be implemented in relation to a heterogeneous file system, such as the SAN file system 216, and thus may not necessarily be implemented in relation to a SAN. For example, more generally a backup application may be employed to backup file system objects stored on a file system, where some of the file system objects have file system object types not known to the backup application. A backup application running on an operating system that has as a native file system the NTFS, for instance, may be employed to backup file system objects stored on a UNIX® or a LINUX® file system, and where there is no SAN present. As another example, a backup application running on an operating system that has as a native file system the UNIX® file system may be employed to backup file system objects stored on the NTFS, and where there is no SAN present.

It is noted that the invention can take the form of an entirely hardware embodiment, an entirely software embodiment or an embodiment containing both hardware and software elements. In one embodiment, for instance, the invention is implemented in software, which includes but is not limited to firmware, resident software, microcode, and so on. Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disc. Current examples of optical discs include a compact disc-read only memory (CD-ROM), a compact disc-read/write (CD-RW) and a digital versatile disc (DVD).

Figure 3:
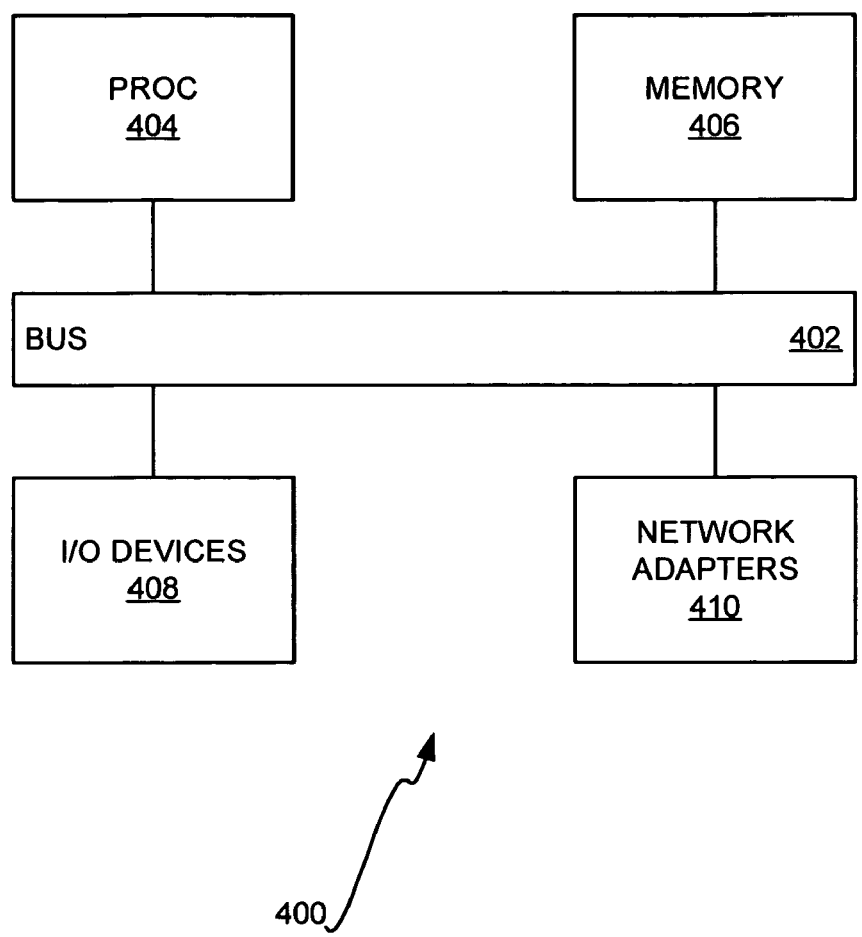
FIG. 3 is a diagram of an exemplary computerized system, in conjunction with which embodiments of the invention may be practiced.

FIG. 3 shows an exemplary computerized system 400, in relation to which an embodiment of the invention may be implemented. The computerized system 400 is a data processing system suitable for storing and/or executing program code, and includes at least one processor 404 coupled directly or indirectly to memory elements 406 through a system bus 402. The memory elements 406 can include local memory employed during actual execution of the program code, bulk storage, and cache memories, the latter which provide temporary storage of at least some program code in order to reduce the number of times code must be retrieved from bulk storage during execution.

The computerized system 400 further can include input/output (I/O) devices 408, which include but are not limited to keyboards, displays, pointing devices, and so on. Such I/O devices 408 can be coupled to the system 400 either directly or through intervening I/O controllers. Network adapters 410 may also be coupled to the system 400 to enable the system 400 to become coupled to other systems, or to remote printers, storage devices, and so on, through intervening private or public networks. Modems, cable modem and Ethernet cards are just a few examples of currently available types of the network adapters 410.

Detailed Methods and Conclusion

Figure 4:
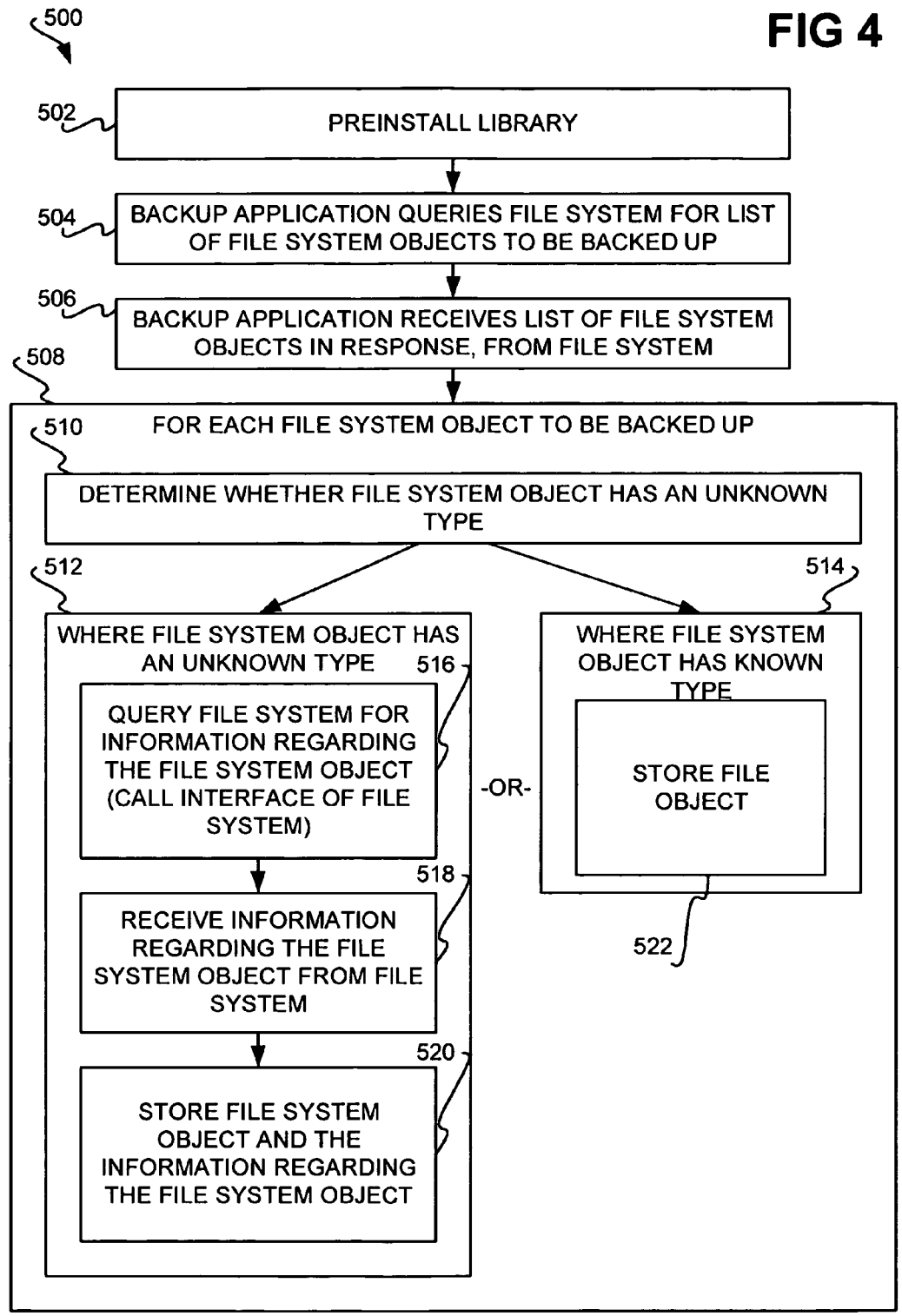
FIG. 4 is a flowchart of a method for heterogeneous file system backup, according to an embodiment of the invention.

FIG. 4 shows a method 500 for performing heterogeneous file system backup, according to an embodiment of the invention. That is, the method 500 is for backing up the file system objects stored on a file system, where at least some of the file system objects may have unknown file system object types. The method 500 is described in relation to a backup application performing the backup process. The method 500 is more detailed than, but consistent with, the method 100 of FIG. 1 that has been described.

First, a library may be preinstalled on the computing device that has a computer program, such as a backup application, running thereon that is performing the method 500 (502). The library is preinstalled in the sense that it is installed before other parts of the method 500 are performed. The library exposes an interface. The library may be the library 224 of FIG. 2, and the interface may be part of the interface 226 of FIG. 2. The interface may be called by the backup application in order to receive information regarding a file system object that has a type unknown to the backup application. In response, the file system provides this information, such as in the form of a binary large object (BLOB), to the backup application.

The method 500 is performed by a backup application in order to back up all the file system objects that are stored at a file system. Therefore, when the backup application is to perform a backup of all these file system objects, it queries the file system for a list of all the file system objects stored at the file system to be backed up by the backup application (504). The backup application queries the file system for this list of file system objects so that it can learn of all the file system objects on the file system, which are to be backed up by the backup application. Without such querying, the backup application does not know what file system objects of the file system have to be backed up. In response, the backup application receives a list of file system objects from the file system (506). Therefore, the backup application now knows all the file system objects of the file system that it is to back up. The following is then performed for each file system object to be backed up by the backup application (508)—that is, for each file system object within the list.

First, the backup application determines whether the file system object has a type that is unknown to it (510). For instance, the backup application may call a file system component that has been installed on the same computing device on which the backup application is running. The file system component is a component of the file system being backed up that exposes a native file system to the operating system on which the backup application is running. Thus, the backup application interacts with the file system component as if it were the native file system for the operating system on which the backup application is running. If the file system component returns that the file system object has an unknown type, then the backup application is able to conclude that the type of the file system object is not known. By comparison, if the file system component returns that the file system object has a given type other than being unknown, then the backup application is able to conclude that the type of the file system object is known.

Next, either part 512 is performed or part 514 is performed as to the file system object, depending on whether the file system object has a type that is unknown or known. Part 512 is performed if the file system object's type is unknown to the backup application. Therefore, the file system is queried for information regarding the file system object (516). This information is sufficient for the file system to later recreate the file system object if necessary, when presented with the information along with the file system object itself. The backup application may query the file system by, for instance, calling the interface of the preinstalled library, as has been described.

In response, the backup application receives from the file system the information regarding the file system object that is sufficient for the file system to recreate the file system object thereat (518). The backup application stores this information, as well as the file system object itself (520). The information and the file system object can be stored on a backup storage device, such as on a tape inserted into a tape backup device. The file system object can thus be considered as being sufficiently backed up, even though it has a type that is unknown to the backup application.

Part 514 is performed if the file system object's type is known to the backup application. In this case, the file system object is simply stored (522), such as on a backup storage device like on a tape inserted into a tape backup device. No additional information needs to be received from the file system to sufficiently back up the file system object. This is because since the backup application knows the type of the file system object in question, it can be assured that the file system object as stored contains all the information that is needed for the file system to later recreate the file system object. That is, additional information does not need to be obtained from the file system and stored with the file system object.

Figure 5:
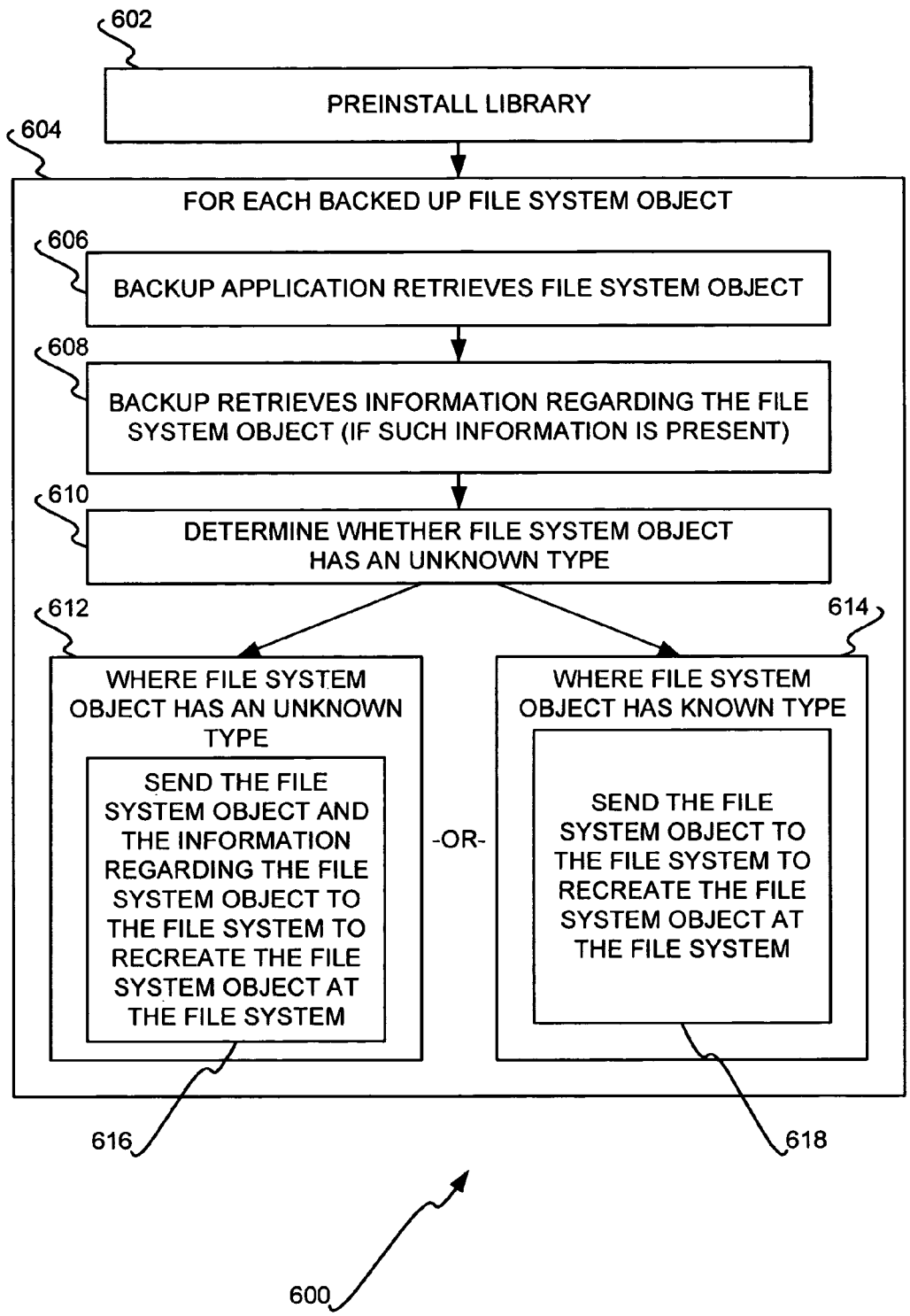
FIG. 5 is a flowchart of a method for heterogeneous file system restore, according to an embodiment of the invention.

FIG. 5 shows a method 600 for performing heterogeneous file system restore, according to an embodiment of the invention. That is, the method 600 is for restoring file system objects back to a file system, where at least some of the file system objects may have file system object types not known to the backup application that backed up the file system objects. For instance, the backup application may be running on an operating system for which the file system exposed the native file system of the operating system, via an appropriate file system component installed on the same computing device as the operating system, as has been described. As such, the operating system and the backup application interact with the file system as if it were the native file system of the operating system, and the file system in actuality may be a different type of file system storing file system objects having types not known to this native file system. The method 600 may be performed after performance of the method 500, where one or more of the file system objects that have been backed up from the file system need to be restored back to the file system. The method 600 is described in relation to a backup application performing the restore process.

First, a library may be preinstalled at the computing device on which a computer program, such as a backup application, is running that is performing the method 600 (602), if it has not already been done so. The library is preinstalled in the sense that it is installed prior to the other parts of the method 600 being performed. Such installation can be performed as is conventionally accomplished. For instance, an executable installer program may be run in order to install the library on the computing device. As another example, the library may be a dynamically linked library (DLL) file that is copied by the backup application or other computer program performing the method 600 to a location within the computing device at which the library is recognized and appropriately utilized by the operating system of the computing device. This location may be a special directory, for instance, into which such files are typically copied. The library exposes an additional interface, besides that described in relation to part 502 of the method 500 of FIG. 4. The library may be the library 224 of FIG. 2, and the interface may be part of the interface 226 of FIG. 2. This additional interface may be called by the backup application to restore a file system object at the file system that has a type unknown to the backup application. In so doing, the backup application provides the file system with the file system object itself, as well as the information regarding the file system object that was previously provided to the backup application by the file system. The information may be in the form of a BLOB, for instance.

Part 604 of the method 600 is then performed for each file system object to be restored back to the file system, such that the part 604 is repeated for each such file system object. First, the backup application retrieves the file system object in question (606), such as from a backup storage device like a tape inserted into a tape backup device, to which the file system object has been previously backed up from the file system. Second, the backup application retrieves information regarding the file system object as well (608), if such information is present, such as from a backup storage device like a tape inserted into a tape backup device. This information is that which is sufficient for the file system to recreate the file system object thereat, and which was previously provided to the backup application and stored along with the file system object. Such information is present where the file system object has a type that is not known to the backup application, and is absent where the file system object has a type that is known to the backup application.

Third, the backup application determines whether the file system object has a type that is unknown (610). This determination can be simply made on the basis of whether additional information regarding the file system object was retrieved in part 608 of the method 600. If such information was retrieved regarding the file system object, then it can be concluded that the file system object has a type that is unknown to the backup application. By comparison, if such information was not retrieved, then it can be concluded that the file system object has a type that is known to the backup application.

Part 612 is performed if the file system object has a type that is unknown to the backup application, whereas part 614 is performed if the file system object has a type that is known to the backup application. In part 612, the file system object and the information regarding the file system object is sent by the backup application to the file system (616). This may be accomplished by the backup application calling the aforementioned interface of the library. The backup application passes the file system object and the information regarding the file system object to the file system via this interface. The file system then has sufficient information to be able to properly recreate the file system object at the file system, by definition, since the file system had previously provided the information to the backup application.

By comparison, in part 614, the file system object is simply sent by the backup application to the file system (618). Because the file system object has a type that is known to the backup application, no additional information had to be stored along with the file system object that the file system would need to properly recreate the file system object. Thus, the backup application may not need to call any special interface of the file system to send the file system object to the file system for recreation at the file system. Furthermore, the file system is able to recreate the file system object thereat without having to reference any additional information, as is required for file system objects having unknown types.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. For example, the methods of different embodiments of the invention that have been described can be implemented as computer programs that are stored on computer-readable media of articles of manufacture. Such computer-readable media may be tangible computer-readable media, like recordable data storage media. Therefore, it is manifestly intended that this invention be limited only by the claims and equivalents thereof.

We claim:

1. A computer-implemented method comprising:
receiving a list of file system objects from a first file system, the file system objects to be backed up by a backup application, the backup application running in relation to a second file system different than the first file system, each file system object having a file type that is known to the first file system where the file type of at least one file system object is unknown to the second file system;
for each file system object of the list of file system objects,
determining whether the file type of the file system object is known or unknown to the second file system;
in response to determining that the file type of the file system object is unknown, performing:
querying the first file system to obtain information regarding the file system object for the first file system to later recreate the file system object; and,
storing, by the backup application, the file system object and the information regarding the file system object in the second file system; and,
in response to determining that the file type of the file system object is known,
storing, by the backup application, the file system object at the second file system,
wherein the first file system is queried to obtain the information only with respect to each file system object having an unknown file type, and the first file system is not queried to obtain the information with respect to each file system object having a known file type.

2. The method of claim 1, wherein the list of file system objects is received by the backup application, and the backup application queries the first file system to obtain the information regarding the file system object for the first file system to later recreate the file system object.

3. The method of claim 1, further comprising querying the first file system for the list of file system objects to be backed up from the first file system.

4. The method of claim 1, wherein determining whether the file type of the file system object is known or unknown comprises calling a component of the first file system to determine whether the file type is known or unknown.

5. The method of claim 1, further comprising receiving from the first file system the information regarding the file system object for the first file system to later recreate the file system object.

6. The method of claim 1, wherein querying the first file system to obtain the information regarding the file system object for the first file system to later recreate the file system object comprises calling an interface to obtain the information regarding the file system object to recreate the file system object upon subsequently being provided back to the first file system.

7. The method of claim 6, further comprising installing a library specific to the file system, the library exposing the interface.

8. The method of claim 1, wherein querying the first file system to obtain the information regarding the file system object for the first file system to recreate the file system object comprises querying the first file system to obtain a binary large object (BLOB) attribute of the file system object for the first file system to later recreate the file system object.

9. The method of claim 8, wherein storing the file system object and the information regarding the file system object comprises storing the file system object and the BLOB attribute of the file system object.

10. The method of claim 1, wherein each of the file system objects that has a file type unknown to the backup application is a file type selected from: a symbolic link, a named pipe, and a device special file.

11. A computer-implemented method comprising:
retrieving a file system object to be restored to a first file system;
determining whether a file type of the file system object is known or unknown to a second file system in relation to which a backup application is running, the file type known to the first file system;
in response to determining that the file type of the file system object is unknown,
retrieving information regarding the file system object, as previously provided by the first file system and as previously stored at the second file system, the information regarding the file system object for the first file system to recreate the file system object, where the file system object and the information regarding the file system object are both previously stored by the backup application;
sending the file system object and the information regarding the file system object to the first file system to recreate the file system object at the file first system; and, in response to determining that the file type of the file system object is known,
    sending the file system object to the first file system to recreate the file system object at the first file system,
wherein the information is retrieved only where the file system object has an unknown file type, and the information is not retrieved where the file system object has a known file type,
wherein the file system object is one of a plurality of file system objects that have been backed up to the second file system, each file system object having a file type that is known to the first file system the file type of at least one of the file system objects being unknown to the second file system.

12. The method of claim 11, wherein the backup application retrieves the file system object to be restored to the first file system, the backup application retrieves the information regarding the file system object as previously provided by the file system object, and the backup application sends the file system object and the information regarding the file system object to the first file system.

13. The method of claim 11, further comprising repeating the method for each of at least one additional file system object to be restored to the first file system, as previously backed up from the first file system.

14. The method of claim 11, wherein determining whether the file type of the file system object is known or unknown comprises, where the file system object has the information regarding the file system object for the first file system to recreate the file system object stored with the file system object, concluding that the file type is unknown.

15. The method of claim 11, wherein sending the file system object and the information regarding the file system object to the first file system to recreate the file system object at the file system comprises calling an interface to submit the file system object and the information regarding the file system object to recreate the file system object using the information regarding the file system object.

16. The method of claim 11, wherein the information regarding the file system object comprises a binary large object (BLOB) attribute of the file system object for the first file system to recreate the file system object.

17. The method of claim 11, wherein the file system object that has a file type that is unknown is a file type selected from: a symbolic link, a named pipe, and a device special file.

18. A computerized system comprising:
hardware comprising a processor;
a first file system storing a plurality of file system objects;
a second file system to backup the file system objects, each file system object having a file type that is known to the first file system, where the file type of at least one file system object is unknown to the second file system; and,
an application implemented by the hardware to backup the file system objects from the first file system to the second file system,
wherein the application is to, for each file system object of the list of file system objects,
    determine whether a file type of the file system object is known or unknown to the second file system;
    in response to determining that the file type of the file system object is unknown, performing:
        query the first file system to obtain information regarding the file system object for the first file system to later recreate the file system object; and,
        store the file system object and the information regarding the file system object; and,
    in response to determining that the file type of the file system object is known, store the file system object,
wherein the first file system is queried to obtain the information only with respect to each file system object having an unknown file type, and the file system is not queried to obtain the information with respect to each file system object having a known file type.

19. The computerized system of claim 18, wherein the application is a backup application.

20. The computerized system of claim 18, wherein the application has an interface to provide the information to the application regarding a file system object having a file type unknown to the application, in response to the application calling the interface as to the file system object.

21. The computerized system of claim 20, wherein the interface is preinstalled by the application.

22. The computerized system of claim 18, wherein the application is further to restore the file system objects as have been backed up back to the first file system, such that for each file system object having a file type unknown to the application, the application retrieves the information previously stored that is for the first file system to recreate the file system object.

23. The computerized system of claim 22, wherein the first file system has an interface to recreate a file system object having a file type unknown to the application, in response to the application calling the interface as to the file system object and the information regarding the file system object that is for the first file system to recreate the file system object.

24. An article of manufacture comprising:
a tangible computer-readable recordable data storage medium; and,
means in the medium for backing up a plurality of file system objects from a first file system to a second file system, at least one of the file system objects of the file system having a file type that is unknown to the second file system, the file type of each file system object being known to the first file system,
wherein the means is further for, for each file system object of the list of file system objects,
    determining whether a file type of the file system object is known or unknown;
    in response to determining that the file type of the file system object is unknown, performing:
        querying the first file system to obtain information regarding the file system object for the file system to later recreate the file system object; and,
        storing the file system object and the information regarding the file system object at the second file system; and,
    in response to determining that the file type of the file system object is known,
        storing the file system object at the second file system,
wherein the first file system is queried to obtain the information only with respect to each file system object having an unknown file type, and the first file system is not queried to obtain the information with respect to each file system object having a known file type.

25. The article of manufacture of claim 24, wherein the means is further for restoring the file system objects as have been backed up back to the file system, such that for each file system object having an unknown file type, the means retrieves the information previously stored that is for the first file system to recreate the file system object.

* * * * *